(12) United States Patent
Sato

(10) Patent No.: US 8,462,353 B2
(45) Date of Patent: Jun. 11, 2013

(54) SURFACE SHAPE MEASUREMENT APPARATUS

(75) Inventor: Ryuichi Sato, Sendai (JP)

(73) Assignee: Canon Kabushiki Kaisha (JP)

( * ) Notice: Subject to any disclaimer, the term of this patent is extended or adjusted under 35 U.S.C. 154(b) by 96 days.

(21) Appl. No.: 12/891,671

(22) Filed: Sep. 27, 2010

(65) Prior Publication Data

US 2011/0080595 A1    Apr. 7, 2011

(30) Foreign Application Priority Data

Oct. 1, 2009   (JP) .................................. 2009-229993
Mar. 31, 2010  (JP) .................................. 2010-083400

(51) Int. Cl.
    *G01B 11/24*    (2006.01)
(52) U.S. Cl.
    USPC .......................................... 356/601; 356/602
(58) Field of Classification Search
    USPC .............. 356/601–632, 512–514, 493–496, 356/484–485, 489; 382/154; 250/201.6, 201.7, 250/201.4
    See application file for complete search history.

(56) References Cited

U.S. PATENT DOCUMENTS

| | | |
|---|---|---|
| 5,003,166 A | 3/1991 | Girod |
| 5,004,346 A | 4/1991 | Kuhel |
| 5,625,454 A | 4/1997 | Huang et al. |
| 2006/0114475 A1 | 6/2006 | DeGroot et al. |
| 2007/0247639 A1 | 10/2007 | Amstel et al. |
| 2008/0317334 A1 | 12/2008 | Hausler |
| 2011/0080592 A1* | 4/2011 | Sato ............................. 356/511 |

FOREIGN PATENT DOCUMENTS

| | | |
|---|---|---|
| JP | 2764630 B2 | 6/1998 |
| JP | 2002-116010 A | 4/2002 |
| JP | 3474448 B2 | 12/2003 |
| WO | 03/001143 A2 | 1/2003 |
| WO | 03/006920 A1 | 1/2003 |

OTHER PUBLICATIONS

Search report issued on Jan. 10, 2011 issued for European Patent Application No. 10180668.5-2213, which is a counterpart application of the related co-pending U.S. Appl. No. 12/891,648.
Search Report dated Jan. 10, 2011, issued for European Patent Application No. 10180680.0-2213, which is a counterpart application of the related co-pending U.S. Appl. No. 12/891,736.
Search Report dated Jan. 10, 2011, for corresponding European Patent Application No. 10180678.4-2213.
Sato, Ryuichi, "Surface Shape Measurement Apparatus," Specification and Drawings of unpublished related co-pending U.S. Appl. No. 12/891,648, filed Sep. 27, 2010, p. 1-33.
Sato, Ryuichi. "Surface Shape Measurement Apparatus," Specification and Drawings of unpublished related co-pending U.S. Appl. No. 12/891,736, filed Sep. 27, 2010, pp. 1-61.

* cited by examiner

*Primary Examiner* — Tri T Ton
(74) *Attorney, Agent, or Firm* — Rossi, Kimms & McDowell LLP

(57) ABSTRACT

An apparatus for measuring a shape of a surface, comprises a measurement head which measures a direction of a normal from the surface to a reference point by detecting test light obtained when light that passes through the reference point is emitted, is reflected by the surface, and returns to the reference point, a scanning mechanism which scans the measurement head, and a processor which calculates the shape of the surface based on the direction of the normal measured using the measurement head and a position of the reference point.

5 Claims, 4 Drawing Sheets

SURFACE SHAPE MEASUREMENT APPARATUS

BACKGROUND OF THE INVENTION

1. Field of the Invention

The present invention relates to a surface shape measurement apparatus for measuring a shape of a surface to be measured.

2. Description of the Related Art

In recent years, optical systems mounted in, for example, a camera, copying machine, telescope, and exposure apparatus popularly use aspherical optical elements such as aspherical lenses. Furthermore, a surface to be measured includes, for example, that having a free-form curve shape, that having significant undulation, and that having a steep slope. Therefore, a surface shape measurement apparatus is required to have a function of measuring various surfaces to be detected described above. Japanese Patent Laid-Open No. 2002-116010 discloses a three-dimensional shape measurement apparatus. This measurement apparatus measures a shape of an object surface to be measured by using light (return light), which is obtained by irradiating the object surface to be measured with a spherical wave via a small aperture, reflecting the spherical wave by the object surface to be measured, and returning the reflected wave via the small aperture. More specifically, this measurement apparatus detects a tilt angle of the return light with respect to an optical axis using a tilt angle measuring unit, and detects, using a displacement amount detecting unit, a displacement amount of a distance between the reflected position of the light on the object surface to be measured and the small aperture upon scanning the object surface to be measured. Then, this measurement apparatus calculates the shape of the object surface to be measured based on the detected tilt angle and displacement amount.

In a surface shape measurement apparatus, which measures a shape by scanning a measurement head (probe), it is desirable that the measurement head is compact and lightweight. The compact measurement head contributes to a reduction of a space occupied by the measurement head in the measurement apparatus to broaden a scanning range. The lightweight measurement head contributes to stable measurement precision by eliminating a small deformation of a structure due to partial weighting on the structure of the measurement apparatus upon movement of the measurement head. Since the apparatus described in Japanese Patent Laid-Open No. 2002-116010 is required to detect both the tilt angle and displacement amount, the measurement head gets bulky and heavy accordingly.

SUMMARY OF THE INVENTION

The present invention provides a technique which is advantageous in size and weight reductions of a measurement head in a surface shape measurement apparatus.

One of aspects of the present invention provides an apparatus for measuring a shape of a surface to be measured, comprising a measurement head which measures a direction of a normal from the surface to a reference point by detecting test light obtained when light that passes through the reference point is emitted, is reflected by the surface, and returns to the reference point, a scanning mechanism which scans the measurement head, and a processor which calculates the shape of the surface based on the direction of the normal measured using the measurement head and a position of the reference point, wherein letting (s, t, u) be coordinates of the reference point, ($\alpha$, $\beta$, $\gamma$) be a unit normal vector from the surface to the reference point, (x, y, z) be coordinates of a point on the surface, and $q_0$ be a constant, the processor calculates the shape of the surface based on:

$$(xyz) = (stu) - q(\alpha\beta\gamma)$$

$$q = q_0 + \int(\alpha ds + \beta dt + \gamma du)$$

Further features of the present invention will become apparent from the following description of exemplary embodiments with reference to the attached drawings.

DESCRIPTION OF THE EMBODIMENTS

A shape measurement apparatus according to the present invention is suited to measuring surface shapes of smoothly continuous objects such as lenses, mirrors, and molds used in, for example, a camera (including a video camera), copying machine, telescope, and exposure apparatus.

Figure 3:
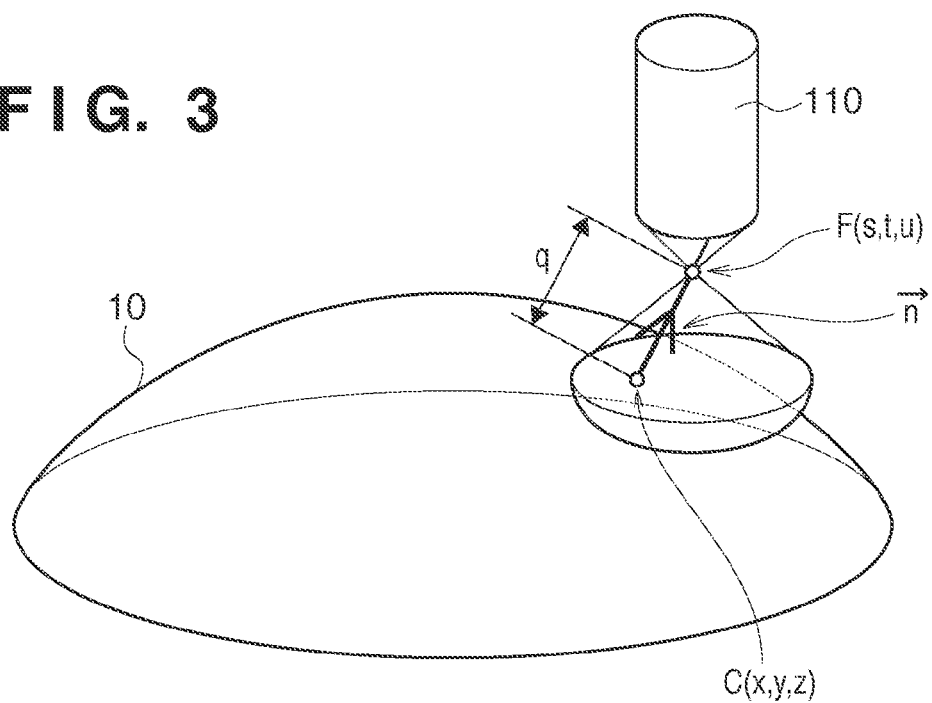
FIG. 3 is a schematic view showing the arrangement of the surface shape measurement apparatus according to the first embodiment of the present invention.

The basic principle of the surface shape measurement apparatus according to the present invention will be described first. FIG. 3 shows related parameters. The surface shape measurement apparatus has a measurement head 110 required to measure a surface shape of a surface 10 to be measured. FIG. 3 illustrates a case in which the measurement head 110 emits a spherical wave and the center of that spherical wave is set as a reference point. A point F(s, t, u) represents coordinates of a center of a spherical wave emitted from the measurement head 110, that is, a reference point. A point C(x, y, z) represents coordinates of a point where the spherical wave having the point F(s, t, u) as the center is reflected by the surface 10, and returns to the point F. Reference symbol q denotes a distance between the point C(x, y, z) and point F(s, t, u), that is equivalent to the perpendicular distance from the point F to the surface 10. n=($\alpha$, $\beta$, $\gamma$) is a unit normal vector at the point C(x, y, z) of the surface 10. The surface shape measurement apparatus measures the coordinates of the point F(s, t, u) and the unit normal vector n=($\alpha$, $\beta$, $\gamma$) while scanning the measurement head 110, and decides a coordinate group of the points C(x, y, z), that is, a surface shape on the surface 10 based on the measurement result.

Since the point C(x, y, z) is located on a spherical surface having the point F(s, t, u) as the center and a radius q, we have:

$$(x-s)^2 + (y-t)^2 + (z-u)^2 = q^2 \qquad (1)$$

Partial differentiations of both the sides of equation (1) yield:

$$x = s - q\partial q/\partial s$$

$$y = t - q\partial q/\partial t$$

$$z = u - q\partial q/\partial u \qquad (2)$$

According to a property of the unit normal vector, since $\alpha=\partial q/\partial s$, $\beta=\partial q/\partial t$, and $\gamma=\partial q/\partial u$, equations (2) can be expressed in a vector format like:

$$(xyz)=(stu)-q(\alpha\beta\gamma) \qquad (3)$$

$$(\alpha\beta\gamma)=(\partial q/\partial s \, \partial q/\partial t \, \partial q/\partial u) \qquad (4)$$

Furthermore, equation (4) can be expressed in an integral format as:

$$q=q_0+\int(\alpha ds+\beta dt+\gamma du) \qquad (5)$$

where $q_0$ is an integral constant.

Therefore, from the reference point position F(s, t, u) of the measurement head 110 and the unit normal vector ($\alpha$ $\beta$ $\gamma$) from the surface to be measured to the reference point F, the perpendicular distance q is obtained by equation (5), and is substituted in equation (3) to obtain a shape.

First Embodiment

Figure 1A:
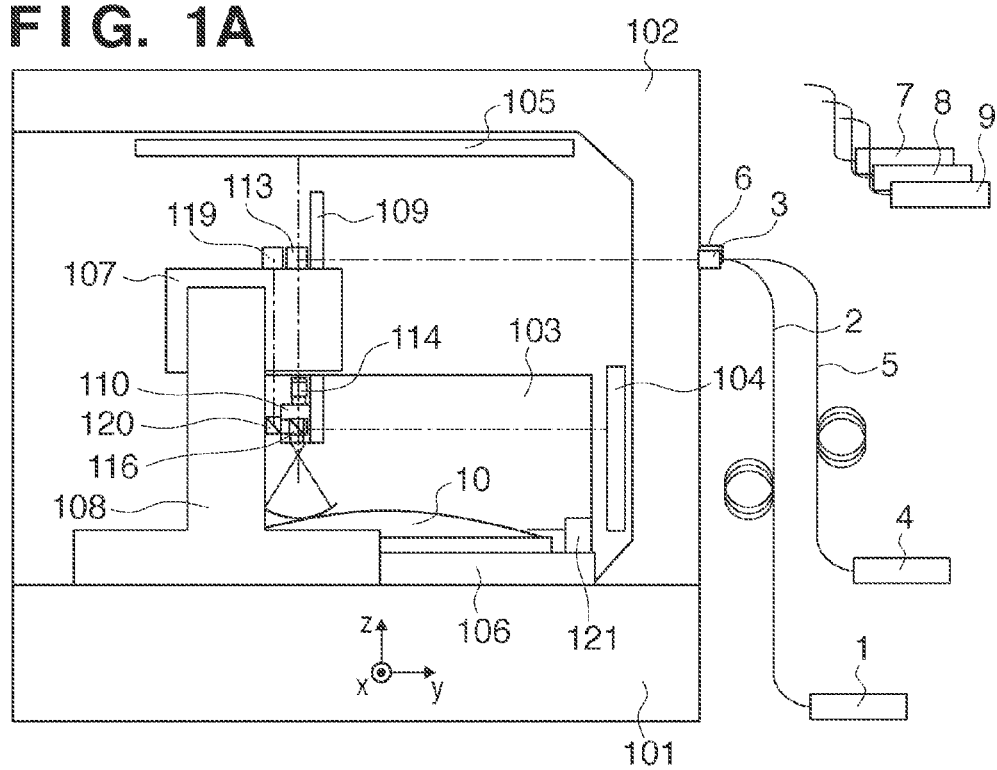
FIGS. 1A and 1B are schematic views showing the arrangement of a surface shape measurement apparatus according to an embodiment of the present invention.
Figure 1B:
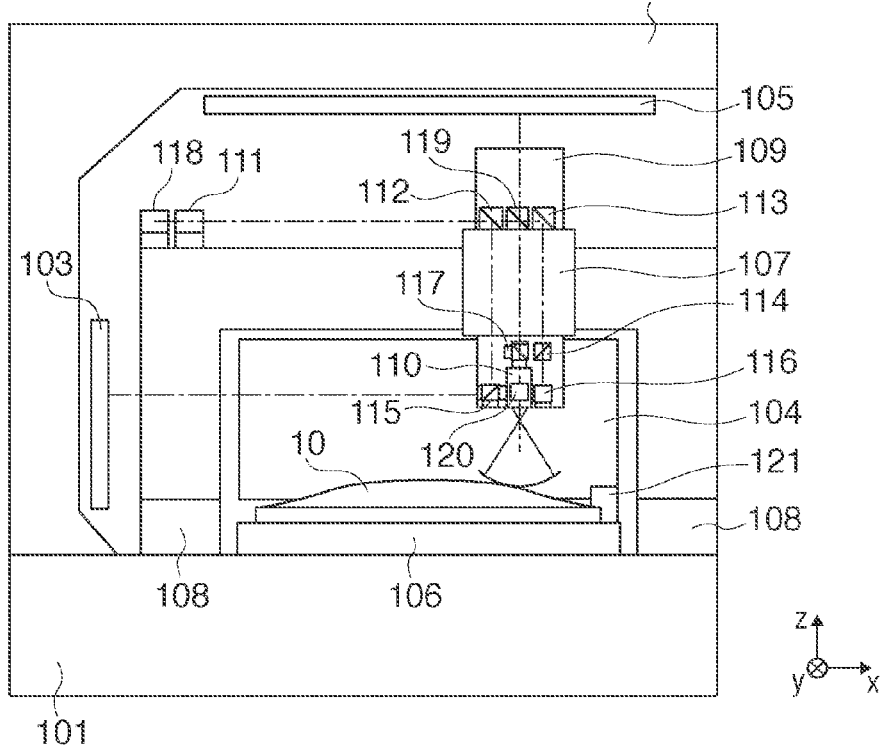

FIGS. 1A and 1B are schematic views showing the arrangement of a surface shape measurement apparatus according to the first embodiment of the present invention. FIG. 1A is a front view, and FIG. 1B is a side view. In this case, an xyz coordinate system is defined, as shown in FIGS. 1A and 1B. The surface shape measurement apparatus includes a base plate 101, a reference frame 102 supported by the base plate 101, a work holder 106 supported by the base plate 101, and a measurement head 110. The work holder 106 holds an object to be measured having a surface 10 to be measured. The surface shape measurement apparatus includes a reference plane mirror 103 required to measure an x position of the measurement head 110, a reference plane mirror 104 required to measure a y position of the measurement head 110, and a reference plane mirror 105 required to measure a z position of the measurement head 110. These mirrors are attached to the reference frame 102.

The surface shape measurement apparatus further includes, as a scanning mechanism for scanning the measurement head 110, an XYZ stage mechanism including an X-slide 107, Y-slide 108, and Z-slide 109. The measurement head 110 is mounted on the Z-slide 109, which is mounted on the X-slide 107 and is driven in a z-axis direction by a driving mechanism (not shown). The X-slide 107 is mounted on the Y-slide 108, and is driven in an x-axis direction by a driving mechanism (not shown). The Y-slide 108 is mounted on the base plate 101, and is driven in a y-axis direction by a driving mechanism (not shown). Hence, the surface shape measurement apparatus has an arrangement which can three-dimensionally change a relative positional relationship between the measurement head 110 and surface 10 to be measured.

A laser beam emitted from a 2-frequency oscillation laser 1 for heterodyne interferometric distance measurement is guided to a fiber input collimator 3 via a polarization-maintaining fiber 2. A mirror 111 attached to the Y-slide 108 reflects the laser beam emerging from the collimator 3. After that, the laser beam is guided to laser interferometers 115, 116, and 117 by a non-polarizing beam splitter 112 and reflecting prism 113 attached on the X-slide 107 and a non-polarizing beam splitter 114 attached on the Z-slide 109. In this case, the laser interferometers 115, 116, and 117 are those for respectively measuring the x, y, and z positions. Interference signals obtained by the laser interferometers 115, 116, and 117 are provided to a signal processing unit 7 via an optical fiber (not shown). An XYZ stage control unit 8 controls the X-, Y-, and Z-slides 107, 108, and 109.

A computer (processor) 9 includes a function of setting a scanning path of the measurement head 110, a function of acquiring a measurement data group, a function of calculating the surface shape of the surface 10 as a three-dimensional coordinate group, a function of calibrating the coordinates of the scanning path, and a function of correcting the measurement result of the surface shape of the surface 10. The computer 9 generates a coordinate group that expresses the scanning path, and the control unit 8 of the XYZ stage mechanism controls driving mechanisms (not shown) in the XYZ stage mechanism based on the coordinate group, thereby scanning the measurement head 110 along the scanning path. The computer 9 acquires, as a measurement data group, the unit normal vector information n from the measurement head 110 on the scanning path and the position information of the measurement head 110 from the laser interferometers 115, 116, and 117 via the signal processing unit 7. The computer 9 executes arithmetic processing of the acquired measurement data group to calculate the surface shape of the surface 10 as a three-dimensional coordinate group, to calibrate the coordinates of the scanning path, and to correct the measurement result of the surface shape of the surface 10.

The surface shape measurement apparatus includes an origin unit 121 which specifies an origin of the xyz coordinate system of the surface shape measurement apparatus. The origin unit 121 includes a concave spherical surface (not shown), and the center of curvature of that spherical surface is specified as the origin of the xyz coordinate system of the surface shape measurement apparatus.

A laser unit 4 is a light source that provides a light beam to the measurement head 110. The laser unit 4 emits a linearly polarized light beam for direction measurement, and provides it to the measurement head 110. The laser beam emitted by the laser unit 4 is guided to a beam expander 1201 of the measurement head 110 shown in FIG. 2 via a polarization-maintaining fiber 5, fiber input collimator 6, and mirrors 118, 119, and 120.

The measurement head 110 will be described below with reference to FIG. 2. The measurement head 110 includes an illumination optical system and light receiving optical system. The illumination optical system is configured by a beam expander 1201, polarizing beam splitter 1202, λ/4 plate 1209, and objective lens 1210. The light receiving optical system is configured by the objective lens 1210, the λ/4 plate 1209, the polarizing beam splitter 1202, a condenser lens 1205, and a shielding member 1207. A light beam emerging from the beam expander 1201 is S-polarized light, is reflected by the polarizing beam splitter 1202, and travels toward a surface 10 to be measured side.

The light beam which travels toward the surface 10 side is converted into circularly polarized light by the λ/4 plate 1209, and enters the objective lens 1210. This light beam is converted into a spherical wave having a focal point 1211 (point F) of the objective lens 1210 as a center of curvature. The spherical wave becomes incident on the surface 10, and is reflected by the surface 10. Of light beam components reflected by the surface 10, a light beam 1212 which is reflected in a normal direction to the surface 10 goes back through the objective lens 1210 as test light, is transmitted through the λ/4 plate 1209 again, and is linearly converted by the λ/4 plate 1209. The light beam transmitted through the λ/4 plate 1209 is linearly polarized light of P-polarized light components with respect to the polarizing beam splitter 1202. Hence, this light beam is transmitted through the polarizing beam splitter 1202, travels toward the condenser lens 1205 side, and reaches a position detecting unit 1208. The position detecting unit 1208 includes a two-dimensional position sensing detector (PSD), and detects a light beam position signal indicating the position of the light beam which enters the PSD as information of a direction of the light beam 1212 which is reflected by the surface 10 in the normal direction and returns to the measurement head 110. This light beam position signal includes information indicating a light amount. The detected light beam position signal is provided to a signal processing unit 7 via a cable 1213. The signal processing unit 7 detects, based on the light beam position signal provided from the measurement head 110, a unit normal vector indicating a direction of the light beam 1212 which is reflected by the surface 10 in the normal direction and returns to the measurement head 110, that is, a normal vector to the surface 10.

Figure 2:
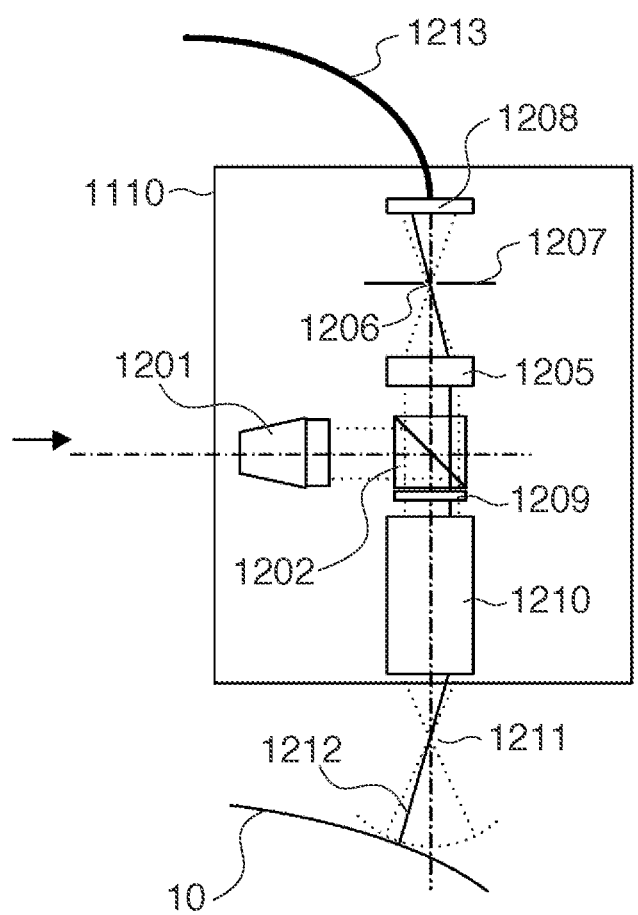
FIG. 2 is a schematic view showing the arrangement of a measurement head according to the embodiment of the present invention.

In FIG. 2, a focal point 1206 of the condenser lens 1205 has a conjugate relationship to the focal point 1211 (point F) of the objective lens 1210. The shielding member 1207 passes only a light beam which is focused on the focal point 1206 of the condenser lens 1205 and near the focal point 1206 through itself. Then, only the light beam 1212, which is reflected in the normal direction of the surface 10, of those reflected by the surface 10, enters the position detecting unit 1208. Therefore, this light beam position signal includes information indicating a normal vector to the surface 10.

However, the light beam position signal often does not indicate a normal vector to the surface 10 depending on the shape of the surface 10. For example, this is the case when the surface 10 has a common center of curvature over a broad region, and the position of the center of curvature of the surface 10 matches the reference point F on the scanning path. In this case, such phenomenon is caused since reflected light from the broad region enters the position detecting unit 1208. For example, this phenomenon may occur when the surface 10 is a spherical surface. In such case, by setting the scanning path to be sufficiently separated away from the center of curvature of the surface 10, the light beam position signal can indicate a normal vector to the surface 10. Therefore, it becomes possible to measure the shape of the surface 10.

Also, the light beam position signal does not indicate a normal vector to the surface 10 when the surface 10 has two or more intersecting normals, and an intersection of the two or more normals on the surface 10 matches the reference point F on the scanning path. This is because reflected light beams from a plurality of different regions enter the position detecting unit 1208. Even in such case, by setting the scanning path to be sufficiently separated away from the intersection of the two or more normals on the surface 10, a change in optical path length can be correctly obtained. Therefore, it becomes possible to measure the shape of the surface 10.

A calculation method of a unit normal vector in this embodiment will be described below more practically. The position detecting unit 1208 detects x and y positions of the test light beam 1212. More specifically, the position detecting unit 1208 generates light beam position detection signals indicating the x and y positions of the test light beam 1212. Let Dx and Dy be the x and y positions of the test light beam 1212, respectively. This x position is proportional to a direction cosine $\alpha$ with respect to an x axis, and the y position is proportional to a direction cosine $\beta$ with respect to a y axis. Letting K be this proportional coefficient, the positions Dx and Dy of the test light beam detected by the position detecting unit 1208 are respectively given by:

$Dx=K\alpha$ $Dy=K\beta$ where K is a constant specified based on the arrangement of the light receiving optical system of the measurement head 110. From this relationship and a property of a unit normal vector, which is given by:

$\alpha^2+\beta^2+\gamma^2=1$ the unit normal vector can be calculated as:

$\alpha=Dx/K$ $\beta=Dy/K$ $\gamma=(1-\alpha^2-\beta^2)^{1/2}$

As described above, the point F(s, t, u) represents coordinates of a center of a spherical wave emitted from the measurement head 110, that is, a reference point. A point C(x, y, z) represents coordinates of a point where a spherical wave having the point F(s, t, u) as the center is reflected in the normal direction by the surface 10. Reference symbol q denotes a distance between the point C(x, y, z) and point F(s, t, u). $n=(\alpha, \beta, \gamma)$ is a unit normal vector at the point C(x, y, z) of the surface 10.

The coordinates of the point F(s, t, u) are measured using the laser interferometers 115, 116, and 117, as will be described in detail later. The unit normal vector $n=(\alpha, \beta, \gamma)$ is measured using the measurement head 110. As described above, the point C(x, y, z) on the surface 10 can be expressed by equations (3), (4), and (5). The laser interferometers 115, 116, and 117 measure the position of the point F while scanning the measurement head 110 along the scanning path, and the measurement head 110 measures the unit normal vector $n=(\alpha, \beta, \gamma)$. Then, according to equations (3), (4), and (5), a coordinate group of the point C on the surface 10, that is, a surface shape can be calculated.

When the laser interferometers 115, 116, and 117 measure the position of the point F(s, t, u) while scanning the measurement head 110 along the scanning path, and the measurement head 110 measures the unit normal vector $n=(\alpha, \beta, \gamma)$, the following measurement data group can be obtained. Note that suffices 1, 2, ..., j, ..., N mean data numbers.

$(s_1, t_1, u_1), (\alpha_1, \beta_1, \gamma_1)$ $(s_2, t_2, u_2), (\alpha_2, \beta_2, \gamma_2)$ $\vdots$ $(s_j, t_j, u_j), (\alpha_i, \beta_i, \gamma_i)$ $\vdots$ $(s_N, t_N, u_N), (\alpha_N, \beta_N, \gamma_N)$ Of this data group, a distance $q_j$ at the i-th measurement point can be calculated as follows.

From equation (5), the distance $q_j$ at a point i=j is given by:

$$q_j = q_0 + \sum_{k=2}^{i}(\alpha_k \Delta s_k + \beta_k \Delta t_k + \gamma_k \Delta u_k) \quad (6)$$

for $(\Delta s_k, \Delta t_k, \Delta u_k)=(s_k, t_k, u_k)-(S_{k-1}, t_{k-1}, u_{k-1})$ A method of specifying an integral constant $q_0$ will be described later.

In this case, the position $(s_j, t_j, u_j)$ of the point F and the unit normal vector $(\alpha_j, \beta_j, \gamma_j)$ at the measurement point j, and the distance q calculated by equation (6) are substituted in equation (3). Then, coordinates $C_j(x_j, y_j, z_j)$ of the surface 10 at the j-th measurement point are given by:

$$(x_j, y_j, z_j) = (s_j, t_j, u_j) - q_j(\alpha_j, \beta_j, \gamma_j) \quad (7)$$

By making these calculations for the respective measurement points, a set of coordinate points which express the surface shape of the surface 10 can be decided like:

$$(x_1, y_1, z_1) \quad (8)$$
$$(x_2, y_2, z_2)$$
$$\vdots$$
$$(x_j, y_j, z_j)$$
$$\vdots$$
$$(x_N, y_N, z_N)$$

A method of measuring the reference point $F(s, t, u)$ of the measurement head 110 by the laser interferometers 115, 116, and 117 will be described below. Normally, a laser interferometer measures a position by detecting a displacement amount from an origin since it is an incremental distance measuring device. In this embodiment, the origin unit 121 is used as an arrangement for providing an origin. Assume that the center of a spherical wave emitted by the measurement head 110, that is, the reference point F is matched with the origin of the surface shape measurement apparatus provided by the origin unit 121, and values provided by the laser interferometers 115, 116, and 117 at that time are those corresponding to the origin.

Figure 4:
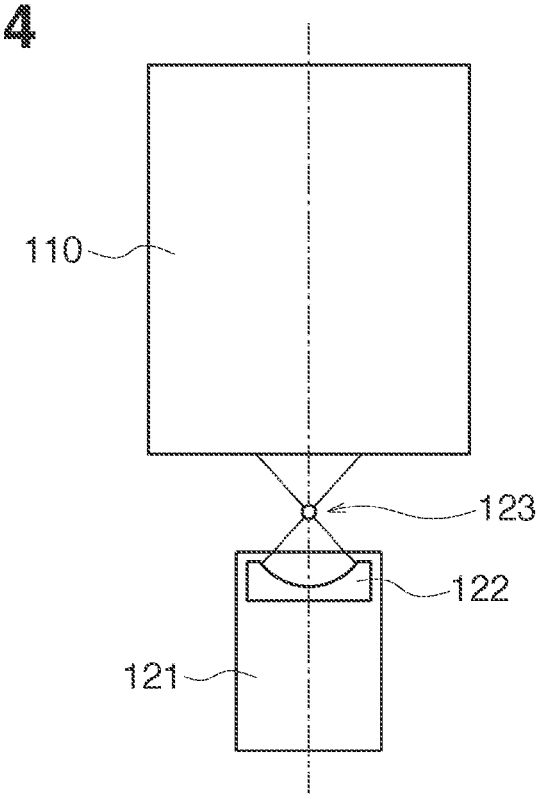
FIG. 4 is a view for explaining a method of deciding an origin of the measurement head.

The method will be described in detail below with reference to FIG. 4. The center of curvature of a concave spherical surface 122 included in the origin unit 121 is an origin 123 of the surface shape measurement apparatus. When this origin 123 matches the center of a spherical wave emitted from the measurement head 110, that is, the reference point F, since all light beams reflected by the concave spherical surface 122 return to the measurement head 110, the light beam position signal provided to the direction signal processing unit 7 is maximized. Based on a position of the maximum light amount, it is determined that the origin of the surface shape measurement apparatus provided by the origin unit 121 matches the reference point F of the measurement head 110. Assume that values provided from the laser interferometers 115, 116, and 117 at that time are those corresponding to the origin.

A method of specifying the integral constant $q_0$ will be described below. In a first example, the integral constant $q_0$ can be specified as a perpendicular distance between the reference point F at a starting point of an integral path given by equation (5), that is, that of the scanning path, and the surface 10. Therefore, by calculating the perpendicular distance between the reference point F at the starting point of the scanning path and the surface 10, the integral constant $q_0$ can be specified.

Figures 5A, 5B:
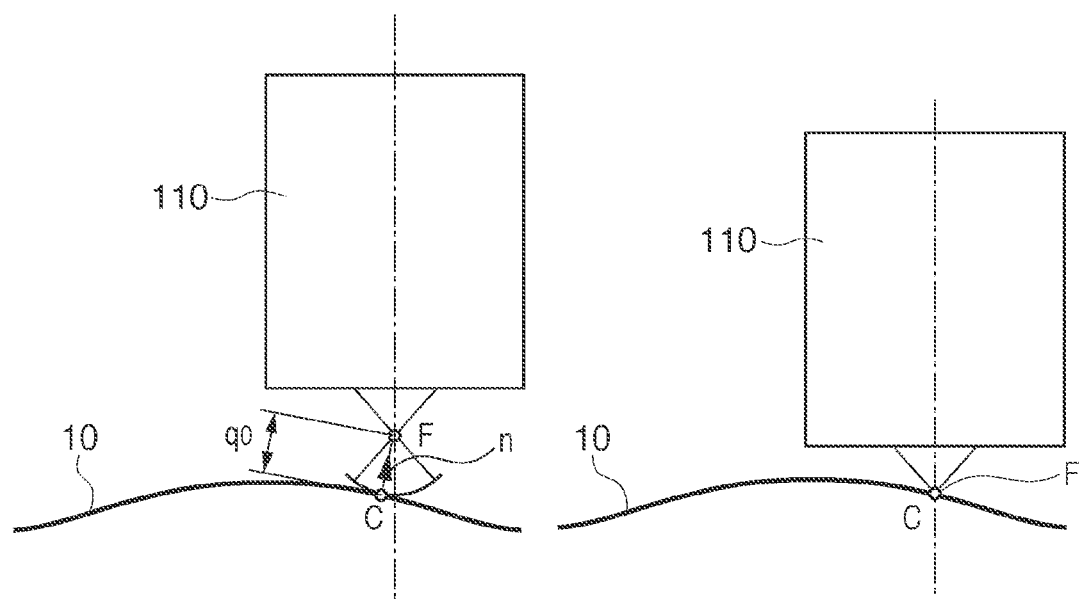
FIGS. 5A and 5B are views for explaining a method of deciding an initial value of a distance between the measurement head and a surface to be measured.

A more practical example will be explained below with reference to FIGS. 5A and 5B. FIG. 5A shows a layout at the starting point of the scanning path. Reference symbol F denotes a reference point; and C, a point on the surface 10 where a spherical wave emitted from the reference point F is reflected in the normal direction. FIG. 5B illustrates that the measurement head 110 is laid out so that the reference point F matches the point C on the surface 10. In this case, the point C in FIG. 5B is the same point as the point C in FIG. 5A, that is, the point on the surface to be measured where a spherical wave emitted from the reference point F is reflected in the normal direction at the starting point of the scanning path. A moving distance when the measurement head 110 is moved along the direction of the unit normal vector n in FIG. 5A from the state shown in FIG. 5A to that shown in FIG. 5B is the integral constant $q_0$.

At the position in FIG. 5B, since a spherical wave emitted from the measurement head 110 is reflected by the surface 10 in an apex reflection state (so-called cat's eye state), a light beam of the largest amount returns to the measurement head 110. Therefore, based on a position where a value of the light beam position signal is maximized while moving the measurement head 110 along the direction of measured values of the unit normal vector n in FIG. 5A, it can be decided that the position of FIG. 5B is reached. Based on the positions of the measurement head 110 in FIGS. 5A and 5B, a moving distance, that is, the integral constant $q_0$ can be calculated. The position of the measurement head 110 is measured by the laser interferometers 115, 116, and 117, as described above.

In a second example, the integral constant $q_0$ can be specified as follows. That is, there is available a method of expressing the surface shape of the surface to be measured based on (a) the integral constant $q_0$ which is specified to minimize shape errors and (b) errors of the surface to be measured from a shape defined by this integral constant $q_0$ and a designed shape. For example, this is the case when a spherical surface shape is expressed by (a) a radius which is specified to minimize shape errors and (b) errors of the surface to be measured (surface precision) from a spherical surface having that radius.

In the second example, the integral constant $q_0$ can be calculated as follows. When an arbitrary value $q_0$ is set as the integral constant $q_0$, a shape can be expressed from equation (7) by:

$$(x_{0j}, y_{0j}, z_{0j}) = (s_j, t_j, u_j) - (q_0 + q_{0j})(\alpha_{0j}, \beta_{0j}, \gamma_{0j})$$

where $(x_{0j}, y_{0j}, z_{0j})$ is a point on the surface t be measured, (s, t, u) represents position coordinates of the reference point F, and $q_0 + q_{0j}$ is a distance from the reference point F to the surface to be measured, which distance is calculated from equation (6) to have the integral constant $q_0$ as an arbitrary value $q_0$.

Also, a designed shape $(x_j, y_j, z_j)$ is given by:

$$(x_j, y_j, z_j) = (s_j, t_j, u_j) - q_j(\alpha_j, \beta_j, \gamma_j) \quad (10)$$

where $(s_j, t_j, u_j)$ represents position coordinates of the reference point F and assumes the same value as in equation (9), and $q_j$ is a distance from the reference point F to the surface to be measured, which distance is calculated from the designed shape.

A closest condition of the shape of the surface to be measured and the designed shape is described by:

$$\text{Minimum} \left\{ \sum_{j=1}^{N} \{(x_{0j} - x_j)^2 + (y_{0j} - y_j)^2 + (z_{0j} - z_j)^2\} \right\} \quad (11)$$

Therefore, equations (9) and (10) are substituted into expression (11), and a least square method is applied for $q_0$, thus calculating the integral constant $q_0$.

As described above, by measuring the position of the reference point F of the measurement head 110 and the unit normal vector $(\alpha, \beta, \gamma)$ while scanning the measurement head 110, the surface shape of the surface 10 can be measured.

Note that the measurement head 110 of this embodiment emits a spherical wave from the reference point F at one time.

However, the measurement head 110 may be configured to emit a narrow light beam corresponding to a part of the spherical wave from the reference point, so as to scan an incident region of the spherical wave on the surface 10 by that narrow light beam. With this configuration of the measurement head 110, since the detecting unit 1208 detects test light reflected by only a narrow region on the surface 10, noise components included in the detection result can be reduced. Since only the narrow region is irradiated with all the light beam from the light source, a low-output light source can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application Nos. 2009-229993, filed Oct. 1, 2009 and 2010-083400, filed Mar. 31, 2010, which are hereby incorporated by reference herein in their entirety.

What is claimed is:

1. An apparatus for measuring a shape of a surface to be measured, the apparatus comprising:
    a measurement head that measures a direction of a normal from the surface to a reference point by detecting test light, which is generated by emitting light that passes through the reference point from the measurement head, reflected from the surface and returning to the measurement head through the reference point;
    a scanning mechanism that scans the measurement head to move the reference point; and
    a processor that calculates the shape of the surface based on the direction of the normal measured using the measurement head and a position of the reference point,
    wherein, letting $(s, t, u)$ be coordinates of the reference point, $(x, y, z)$ be coordinates of a point on the surface, $(\alpha, \beta, \gamma)$ be a unit normal vector from the point $(x, y, z)$ on the surface to the reference point, which is obtained through the measurement by the measurement head as the direction of the normal, and $q_0$ be a constant, the processor calculates:
    q using the measured $(\alpha, \beta, \gamma)$ based on: $q = q_0 + \int(\alpha ds + \beta dt + \gamma du)$; and
    the shape of the surface using the calculated q and the measured $(\alpha, \beta, \gamma)$ based on $(x, y, z) = (s, t, u) - q(\alpha, \beta, \gamma)$.

2. The apparatus according to claim 1, wherein the measurement head emits a spherical wave having the reference point as a center.

3. The apparatus according to claim 1, wherein the measurement head emits a light beam corresponding to a part of a spherical wave so that the light beam passing through the reference point is reflected from the surface and returns to the reference point.

4. The apparatus according to claim 1, wherein the scanning mechanism scans the measurement head along a scanning path, and $q_0$ is a distance between the reference point at a starting point of the scanning path and the point $(x, y, z)$ on the surface.

5. The apparatus according to claim 1, wherein the scanning mechanism scans the measurement head so that the reference point is positioned at a plurality of positions, the measurement head measures the direction of the normal for each of the plurality of positions, the processor calculates q based on the coordinates of the plurality of positions and the directions of the plurality of normals respectively corresponding to the plurality of positions.

* * * * *